(12) United States Patent
Shimizu et al.

(10) Patent No.: US 7,999,986 B2
(45) Date of Patent: Aug. 16, 2011

(54) MIRROR DEVICE DRIVE CONTROL APPARATUS AND PROJECTOR

(75) Inventors: Takeshi Shimizu, Chino (JP); Daisuke Ishida, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 12/749,551

(22) Filed: Mar. 30, 2010

(65) Prior Publication Data

US 2010/0253990 A1 Oct. 7, 2010

(30) Foreign Application Priority Data

Apr. 1, 2009 (JP) ................................. 2009-088719
Feb. 18, 2010 (JP) ................................. 2010-033237

(51) Int. Cl.
*G02B 26/08* (2006.01)
(52) U.S. Cl. ............... 359/199.1; 359/198.1; 359/199.3; 359/214.1
(58) Field of Classification Search .... 359/198.1–200.8, 359/213.1–215.1, 223.1–225.1, 226.2
See application file for complete search history.

(56) References Cited

U.S. PATENT DOCUMENTS

2007/0035799 A1 * 2/2007 Gomi et al. .................. 359/214

FOREIGN PATENT DOCUMENTS

JP 09-97305 4/1997

* cited by examiner

*Primary Examiner* — James Phan
(74) *Attorney, Agent, or Firm* — Harness, Dickey & Pierce, P.L.C.

(57) ABSTRACT

A mirror device drive control apparatus adapted to perform drive control of a mirror device having a hysteresis characteristic, includes: a drive section adapted to drive the mirror device with a drive signal; a detection section adapted to detect a displacement of a movable section of the mirror device, and to generate and then output a detection signal corresponding to the detection; and a start-up processing section adapted to perform a start-up process of the mirror device, wherein the start-up processing section detects a frequency of an envelope included in abnormal vibration of the movable section as a beat frequency fb based on the detection signal of the detection section, obtains a predetermined frequency f1 based on a frequency f of the drive signal of the mirror device with which the beat frequency is detected and the beat frequency fb, and drives the mirror device again with the drive signal having the frequency f1.

4 Claims, 5 Drawing Sheets

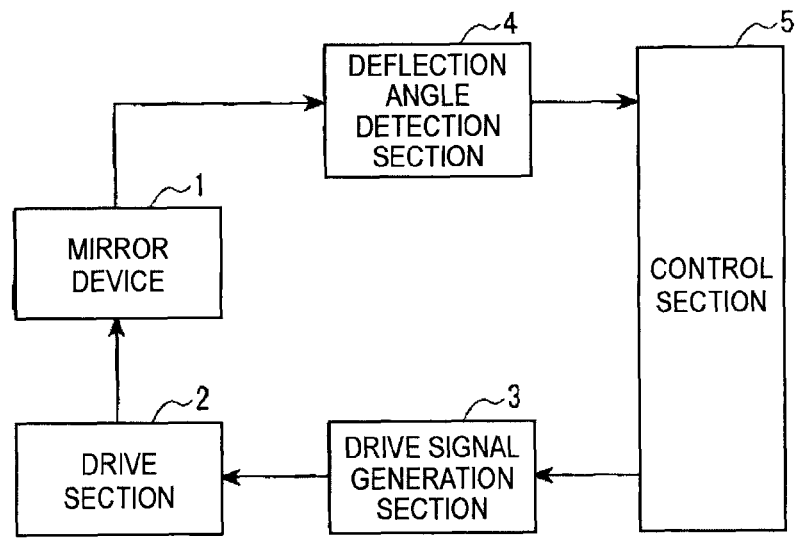
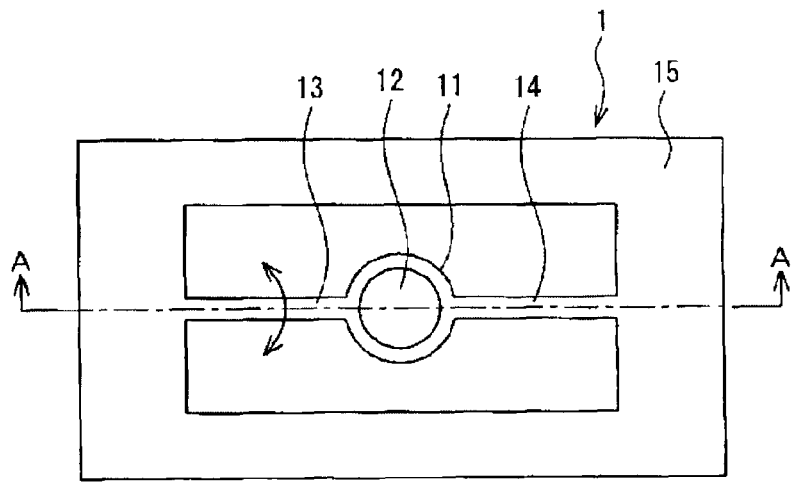
FIG. 2A
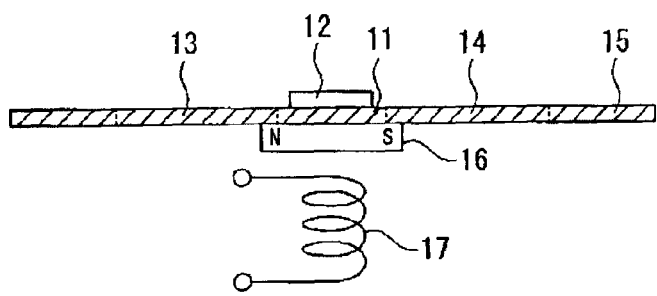
FIG. 2B
FIG. 1

US 7,999,986 B2

MIRROR DEVICE DRIVE CONTROL APPARATUS AND PROJECTOR

BACKGROUND

1. Technical Field

The present invention relates to a mirror device drive control apparatus for performing drive control of a mirror device and a projector.

2. Related Art

In the past, there has been known an optical scanner, which turns (rotates) a mirror device in a one-dimensional direction to thereby perform scanning of light (see, e.g., JP-A-9-97305).

The mirror device is obtained by forming, in a single plate, a mirror section provided with a reflecting surface for reflecting light, a pair of torsional vibration sections for supporting the mirror section from the both sides thereof, an outer frame surrounding the mirror section and the torsional vibration sections, and connection sections for connecting end sections of the pair of torsional vibration sections, which are opposite to the mirror section, to the outer frame.

Further, in such a mirror device, it is arranged that the mirror section is turned around a rotational axis connecting the connection points between the respective torsional vibration sections and the connection sections due to the torsional vibration of the pair of torsional vibration sections to thereby scan the light.

In the case of applying such a mirror device of the related art to, for example, a projector, if it is attempted to enlarge the field angle, it is required to enlarge the vibration amplitude (the deflection angle) when a movable section (the mirror section) of the mirror device deflects.

Therefore, it is desired that the state with a large deflection angle of the movable section is set at the start-up of the mirror device. However, there arises a problem that it takes time to execute the setting in the case in which the mirror device has a hysteresis characteristic (drive frequency hysteresis). Therefore, it is desired to achieve reduction of time for setting the deflection angle of the movable section at the start-up of the mirror device.

SUMMARY

An advantage of some aspects of the invention is to provide a mirror device drive control apparatus and a projector allowing reduction of the time for setting the deflection angle of the movable section at the start-up of the mirror device.

In order to achieve the advantage of the invention, respective aspects of the invention are configured as follows.

According to a first aspect of the invention, there is provided a mirror device drive control apparatus adapted to perform drive control of a mirror device having a hysteresis characteristic, including a drive section adapted to drive the mirror device with a drive signal, a detection section adapted to detect a displacement of a movable section of the mirror device, and to generate and then output a detection signal corresponding to the detection, and a start-up processing section adapted to perform a start-up process of the mirror device, wherein the start-up processing section detects a frequency of an envelope included in abnormal vibration of the movable section as a beat frequency fb based on the detection signal of the detection section, obtains a predetermined frequency f1 based on a frequency f of the drive signal of the mirror device with which the beat frequency is detected and the beat frequency fb, and drives the mirror device again with the drive signal having the frequency f1.

According to a second aspect of the invention, in the mirror device drive control apparatus of the first aspect of the invention, the start-up processing section performs a first process for sequentially increasing the frequency of the drive signal from a frequency for starting the drive to a frequency for ending the drive, and driving the mirror device with the drive section, a second process for obtaining the frequency of the envelope included in the abnormal vibration of the movable section as the beat frequency fb based on the detection signal of the detection section when the frequency of the drive signal is increased in conjunction with the drive of the mirror device, and a third process for obtaining the predetermined frequency f1 based on the frequency f of the drive signal with which the beat frequency fb is obtained and the beat frequency fb, and driving the mirror device again using the drive signal having the frequency f1.

According to a third aspect of the invention, in the mirror device drive control apparatus of the second aspect of the invention, in the first process, the frequency of the drive signal is increased sequentially from the frequency for starting the drive to the frequency for ending the drive by a predetermined frequency Δf, and the drive section drives the mirror device, and in the second process, in conjunction with the drive of the mirror device, the detection signal of the detection section is acquired a plurality of times at predetermined intervals immediately after the frequency of the drive signal is increased by the predetermined frequency Δf, the frequency of the envelope included in the abnormal vibration of the movable section is obtained as the beat frequency fb based on the detection signal acquired the plurality of times.

According to another aspect of the invention, there is provided a projector including a mirror device having a hysteresis characteristic, and the mirror device drive control apparatus according to any one of the first through the third aspect of the invention adapted to perform drive control of the mirror device.

According to these aspects of the invention having the configuration described above, the setting time of the deflection angle of the movable section can be reduced at the start-up of the mirror device.

BRIEF DESCRIPTION OF THE DRAWINGS

The invention will be described with reference to the accompanying drawings, wherein like numbers reference like elements.

FIG. 1 is a block diagram showing a configuration of a mirror device drive control apparatus according to an embodiment of the invention.

FIGS. 2A and 2B are diagrams showing a configuration example of the mirror device, wherein FIG. 2A is a plan view, and FIG. 2B is a cross-sectional diagram along the line A-A in FIG. 2A.

DESCRIPTION OF EXEMPLARY EMBODIMENTS

Figure 3:
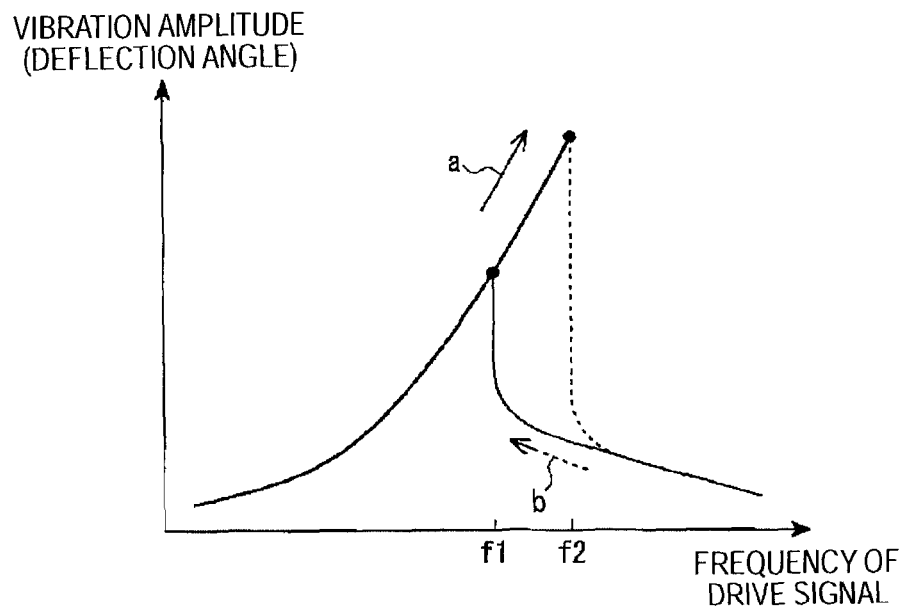
FIG. 3 is a diagram showing an example of a relationship between a drive frequency of the mirror device and vibration amplitude (a deflection angle) corresponding to a deflection of a movable section.

Some embodiments of the invention will hereinafter be explained with reference to the accompanying drawings.
Configuration of Apparatus FIG. 1 is a block diagram showing a configuration of a mirror device drive control apparatus according to an embodiment of the invention.

The mirror device drive control apparatus according to the present embodiment is for performing drive control of a mirror device 1, and is provided with a drive section 2, a drive signal generation section 3, a deflection angle detection section (a vibration amplitude detection section) 4, and a control section 5 as shown in FIG. 1.

As shown in FIGS. 2A and 2B, the mirror device 1 has a frame 15, a movable section 11 movable with respect to the frame 15, and a torsion sections 13, 14 elastically deformable and for connecting the frame 15 and the movable section 11 to each other. The upper surface of the movable section 11 is provided with a mirror section 12 for reflecting light. The mirror section 12 is formed of a metal film made of, for example, Al or Ni. The both ends of the movable section 11 are connected to the frame 15 via the torsion sections 13, 14.

Further, the movable section 11, the torsion sections 13, 14, and the frame 15 are formed using, for example, silicon as a primary material, and the movable section 11, the torsion sections 13, 14, and the frame 15 are formed integrally. As described above, by using silicon as a primary material, a superior rotational characteristic can be achieved, and at the same time, superior durability can be exerted. Further, fine processing (work) can be executed on the silicon, thus downsizing of the mirror device 1 can be achieved.

Further, the lower surface of the movable section 11 is provided with a permanent magnet 16, and under the permanent magnet 16 there is disposed a coil 17. Further, it is arranged that by making an alternating current flow through the coil 17, the torsion sections 13, 14 turn in a direction perpendicular to a length direction thereof, and thus the movable section 11 and the mirror section 12 are deflected.

The mirror device 1 thus configured has a hysteresis characteristic as shown in FIG. 3. This point will be described later.

The drive section 2 drives the mirror device 1 based on a drive signal generated by the drive signal generation section 3. The drive signal generation section 3 generates the drive signal with a desired frequency in accordance with an instruction from the control section 5, and then outputs the drive signal thus generated to the drive section 2.

The deflection angle detection section 4 detects the vibration amplitude (the deflection angle or a displacement) corresponding to the deflection of the movable section 11 of the mirror device 1, in other words, the vibration amplitude corresponding to the deflection of the mirror section 12. The deflection angle detection section 4 is composed of, for example, a combination of a plurality of photodiodes (not shown), and is arranged to reflect the light from a light source (not shown) with the mirror section 12 of the mirror device 1, and then receive it with the photodiodes. Further, the deflection angle detection section 4 is arranged to output a signal representing the vibration amplitude value corresponding to the deflection of the movable section 11 of the mirror device 1 based on the light received by the photodiodes.

Further, as another configuration of the deflection angle detection section 4, the following can be cited.

Specifically, the deflection angle detection section 4 has a piezoresistive element (not shown) disposed on the torsion section 13 of the mirror device 1, a resistance value detection section (not shown) for detecting the resistance value of the piezoresistive element, and an angle detection section (not shown) for obtaining (detecting) the vibration amplitude corresponding to the deflection of the movable section 11 based on the detection result of the resistance value detection section. The piezoresistive element changes the resistance value thereof in accordance with the stress caused by torsional deformation of the torsion section 13 due to the turning of the movable section 11. When the piezoresistive element deforms from a natural state in which no external force is applied, the piezoresistive element shows a resistance value corresponding to an amount of the deformation. Therefore, the angle detection section obtains a degree of the torsion of the torsion section 13 based on the level of the resistance value detected by the resistance value detection section, further obtains the vibration amplitude corresponding to the deflection of the movable section 11 from the level of the torsion, and then outputs the signal representing the vibration amplitude value corresponding to the deflection.

The control section 5 performs a start-up process described later and so on with a predetermined procedure prior to starting up the mirror device 1 to start the drive control (see, e.g., FIG. 5). For this reason, the control section 5 is provided with a CPU, a memory device, and so on although not shown in the drawings.

In the embodiment having the configuration described above, the start-up process described later is performed, and since the start-up process makes use of a novel knowledge as described below, this point will hereinafter be explained.

When driving the mirror device 1 shown in FIGS. 2A and 2B, the variation in the vibration amplitude (the deflection angle) corresponding to the deflection of the movable section 11 of the mirror device 1 with respect to the variation in the frequency of the drive signal has a hysteresis characteristic as shown in FIG. 3, for example. This is because a nonlinear effect of the spring due to the material or the structure of the mirror device 1 appears.

Therefore, when the frequency of the drive signal is raised gradually, the vibration amplitude of the movable section 11 of the mirror device 1 varies as indicated by the arrow "a," and the frequency of the drive signal with the maximum vibration amplitude becomes f2. In contrast, when the frequency of the drive signal is dropped gradually, the vibration amplitude of the movable section 11 of the mirror device 1 varies as indicated by the arrow "b," and the frequency of the drive signal with the maximum vibration amplitude becomes f1.

As described above, the frequency of the drive signal with the maximum vibration amplitude is different between the case in which the frequency of the drive signal is raised gradually and the case in which it is dropped gradually, namely f1 and f2 (f1<f2).

Incidentally, as shown in FIG. 3, in the case, for example, in which the frequency of the drive signal of the mirror device 1 is f2, and the mirror device 1 is in the state (a resonant state) in which the vibration amplitude of the movable section 11 is the maximum, the resonant state may run off from the frequency f2 of the drive signal in some cases due to the variation in environmental temperature around the mirror device 1. In this case, the abnormal vibration is caused in the movable section 11 of the mirror device 1, and in the abnormal vibration there is caused the state in which the vibration amplitude (the deflection angle) of the movable section 11 is changed rapidly to be smaller, and the beat is generated.

Figure 4:
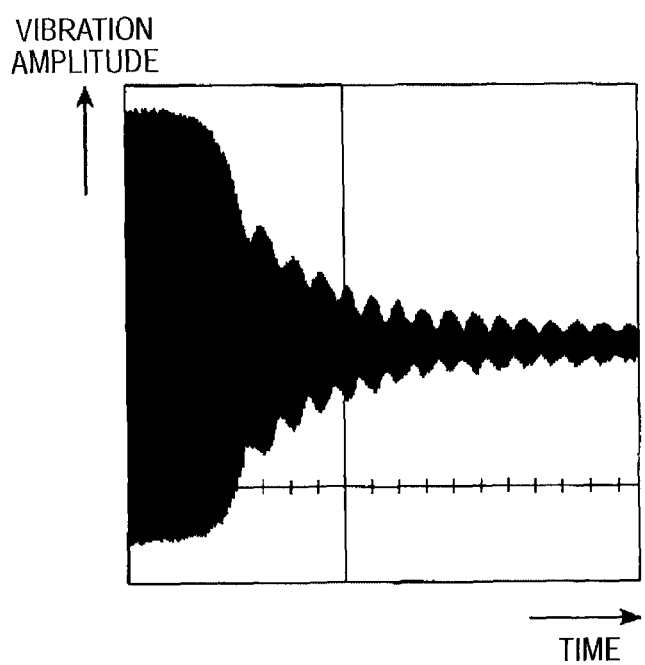
FIG. 4 is a waveform chart showing an example of a vibration waveform immediately after the movable section of the mirror device has generated abnormal vibration.

According to observation of the abnormal vibration of the movable section 11 of the mirror device 1, the vibration waveform shown in FIG. 4 is obtained, and the vibration waveform has the vibration amplitude rapidly decreasing, and includes an envelope corresponding to the beat.

Further, there is obtained the knowledge that assuming the frequency of the envelope as a beat frequency fb, the frequency of the drive signal when the beat is generated as f, the frequency of the drive signal with the maximum vibration amplitude (deflection angle) of the movable section 11 of the mirror device 1 when the frequency of the drive signal is gradually dropped from a high frequency as f1 (see FIG. 4), the formula 1 below is obtained.

$$fb \approx f - f1 \quad (1)$$

Further, by modifying the formula 1, the formula 2 can be obtained.

$$f1 \approx f - fb \quad (2)$$

Therefore, in the case of the embodiment of the invention, since the frequency f of the drive signal when the beat is generated has been known previously, if the frequency of the envelope included in the abnormal vibration of the movable section 11 of the mirror device 1 is obtained as the beat frequency fb, the frequency f1 can be obtained from the formula 2. Therefore, it is arranged that the frequency f1 thus obtained is utilized as described later.

Start-Up Process

Figure 5:
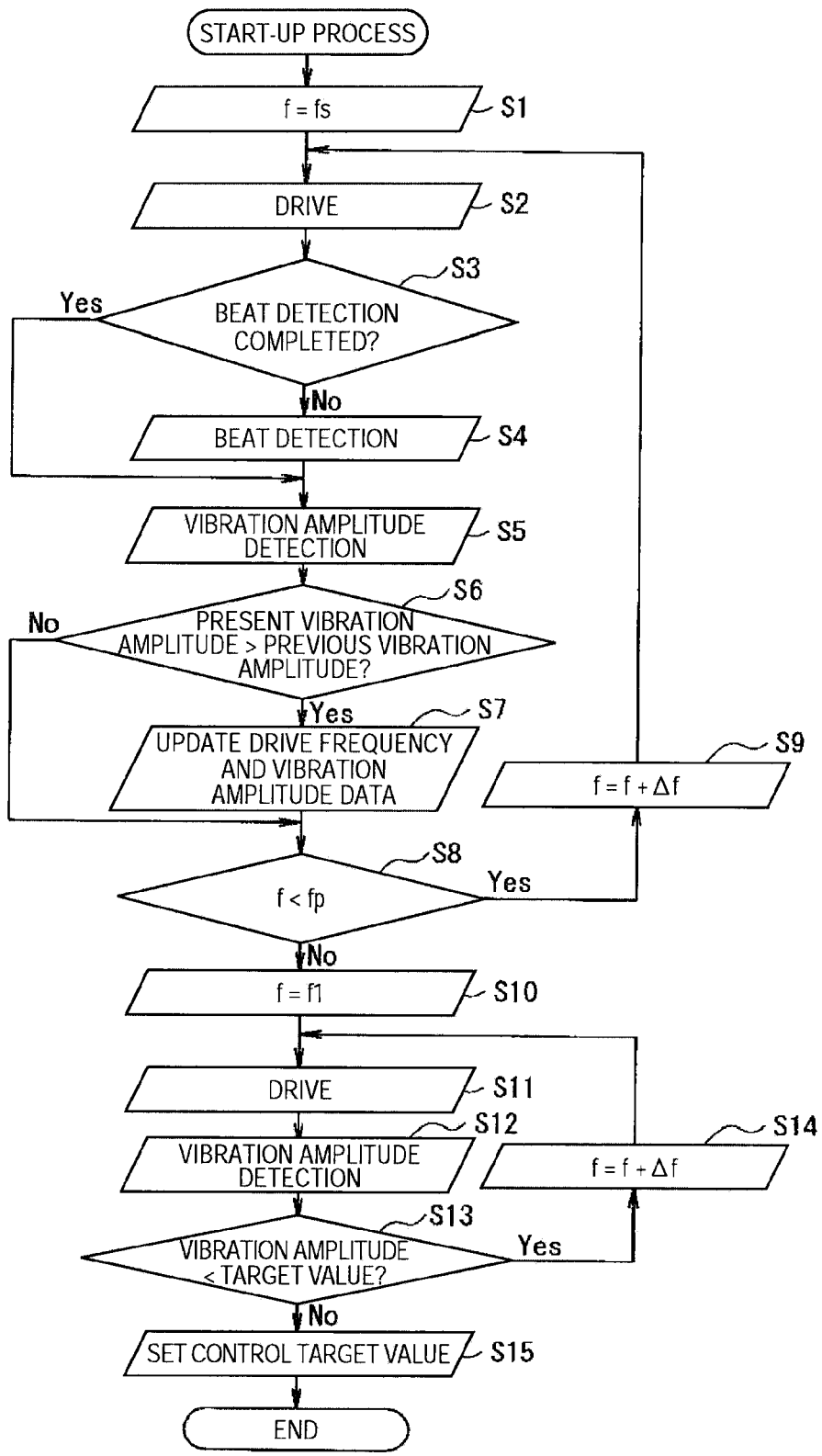
FIG. 5 is a flowchart showing an example of a start-up process of the mirror device.

FIG. 5 is a flowchart showing a procedure of the start-up process performed by the control section 5.

The start-up process is performed by the control section 5 prior to starting up the mirror device 1 to start predetermined drive control, and the rough outline thereof is as follows.

1. The frequency of the drive signal of the mirror device 1 is increased sequentially from fs to fp (see FIG. 6), and the mirror device 1 is driven by the drive section 2.

2. The frequency of an envelope included in abnormal vibration of the mirror device 1 is obtained as the beat frequency fb based on the detection signal of the deflection angle detection section 4 when the frequency of the drive signal is increased in conjunction with the drive of the mirror device 1.

3. The frequency f1 is obtained from the formula 2 based on the frequency f of the drive signal at which the beat frequency fb is obtained and the beat frequency fb, the mirror device 1 is started up again using the drive signal with the frequency f1, and setting a target value (a control target value) of the vibration amplitude of the movable section 11 when performing the drive control of the mirror device 1.

Then, details of the start-up process will be explained with reference to FIGS. 5 and 6.

Figure 6:
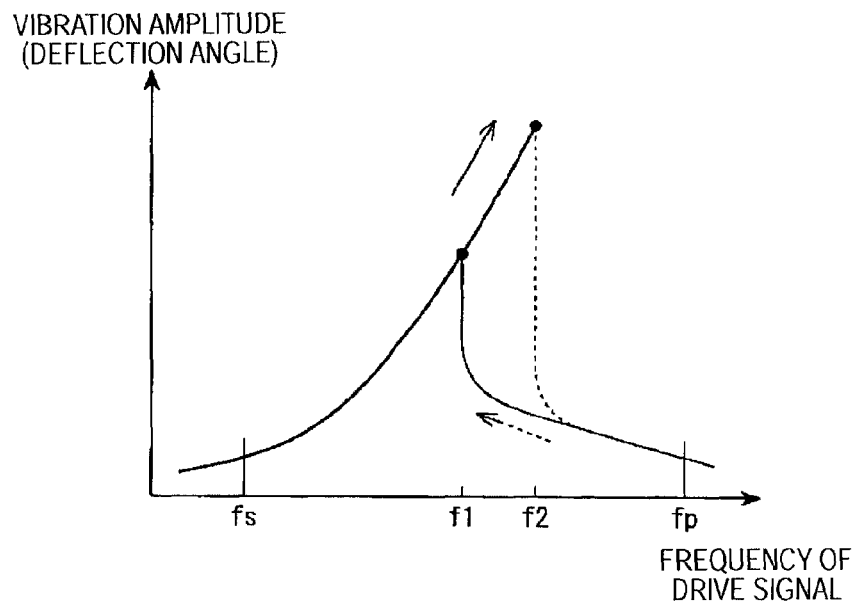
FIG. 6 is a diagram showing an example of a relationship between a drive frequency of the mirror device and vibration amplitude corresponding to a deflection of a movable section in the start-up process.

In the step S1, the frequency fs for starting the drive is set as the frequency f of the drive signal used when driving the mirror device 1 by the drive section 2 (see FIG. 6). Here, the frequency fs for starting the drive is, for example, 8,800 Hz. Subsequently, the drive signal generation section 3 generates the drive signal with the frequency fs for starting the drive based on the instruction from the control section 5, and the drive section 2 drives the mirror device 1 with the drive signal (step S2).

The value of the frequency fs in the step S1 described above and the value of the frequency fp in the step S8 described later are respectively obtained in advance and experimentally so that the start-up process can reliably be performed.

In the step S3, whether or not the beat detection has been completed is determined. As a result of the determination, the process proceeds to the step S4 if it is determined that the beat detection has not been completed, or the process proceeds to the step S5 if it is determined that the beat detection has been completed.

Here, it is arranged that, at first, a flag representing the completion of the beat detection is set to be "0" since the beat detection is not completed, and then the flag is changed to "1" when the beat detection is completed. Further, in the step S3, whether or not the beat detection has been completed is determined based on the flag representing the completion of the beat detection. It should be noted that in the case in which the abnormal vibration is caused in the movable section 11 of the mirror device 1, and the beat frequency fb can be obtained as a result of the beat detection performed in the step S4 described below, the flag is set to be "1" assuming that the beat detection has been completed. In contrast, if the beat frequency fb has failed to be obtained, the flag is kept to be "0" since the beat detection has not been completed.

Figure 7:
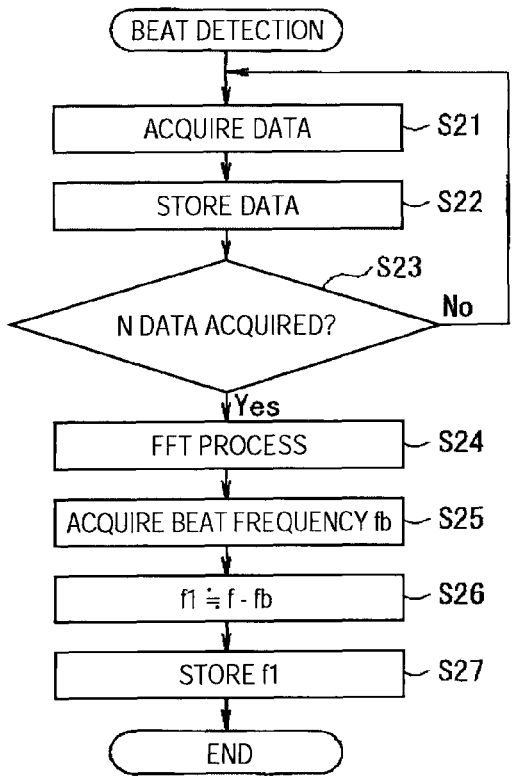
FIG. 7 is a flowchart showing an example of a process of beat detection.

In the step S4, the beat detection is performed with a procedure shown in FIG. 7, and the rough outline of the beat detection is as follows.

Specifically, the beat detection is performed based on the detection signal of the deflection angle detection section 4 immediately after driving the mirror device 1. In this case, if the abnormal vibration is caused in the movable section 11 of the mirror device 1, based on the detection signal of the deflection angle detection section 4, the frequency of the envelope included in the abnormal vibration is obtained as the beat frequency fb. Further, the frequency f1 is obtained from the formula 2 based on the frequency f of the drive signal when the beat frequency fb is obtained and the beat frequency fb (see FIG. 7). Further, the frequency f1 thus obtained is stored in the memory as the frequency of the drive signal for driving the mirror device 1 again, which will be set in the step S10.

In the step S5, the vibration amplitude of the movable section 11 of the mirror device 1 is detected based on the detection signal of the deflection angle detection section 4. In the step S6, whether or not the vibration amplitude of the movable section 11 of the mirror device 1 detected this time is larger than the vibration amplitude thereof detected previously is determined. As a result of the determination, the process proceeds to the step S7 if the present vibration amplitude is larger than the previous vibration amplitude, or the process proceeds to the step S8 if the present vibration amplitude is not larger than the previous vibration amplitude.

In the step S7, the frequency of the drive signal and the vibration amplitude value corresponding thereto are updated with the frequency of the present drive signal and the corresponding vibration amplitude value, respectively. In the step S8, whether or not the frequency f of the present drive signal is lower than the frequency fp for ending the drive is determined. As a result of the determination, the process proceeds to the step S9 if the frequency f is lower than the frequency fp. Here, the frequency fp for ending the drive is, for example, 9,200 Hz.

In the step S9, the frequency f of the drive signal of the mirror device 1 is increased by the predetermined frequency Δf, and then the process returns to the step S2. Here, the predetermined frequency Δf is, for example, 1 Hz.

In the step S2, the mirror device 1 is driven with the drive signal having the new frequency (f=f+Δf), and then the processes of the steps S3 through S8 are performed after the present drive process.

Further, if in the step S8 the frequency f of the present drive signal is not lower than the frequency fp for ending the drive while repeating the series of processes of the steps S2 through S9, the process proceeds to the subsequent step S10.

In the step S10, the frequency f1 obtained and then stored in the step S4 is set as the frequency f of the drive signal for newly driving the mirror device 1.

Subsequently, the drive signal generation section 3 generates the drive signal with the new frequency f1 based on the instruction from the control section 5, and the drive section 2 drives the mirror device 1 with the drive signal (step S11).

In the step S12, the vibration amplitude of the movable section 11 of the mirror device 1 is detected based on the detection signal of the deflection angle detection section 4. In the step S13, whether or not the vibration amplitude thus detected reaches the target value is determined. As a result of the determination, if the vibration amplitude thus detected does not reach the target value, the process proceeds to the subsequent step S14.

In the step S14, the frequency f of the drive signal of the mirror device 1 is increased by the predetermined frequency Δf, and then the process returns to the step S11. In the step S11, the mirror device 1 is driven with the drive signal having the new frequency (f=f+Δf), and then the processes of the steps S12, S13 are performed.

Further, if it is determined in the step S13 that the vibration amplitude thus detected has reached the target value while repeating the series of processes of the steps S11 through S14, the process proceeds to the subsequent step S15. In the step S15, a control target value is set based on the vibration amplitude thus detected. The control target value is equal or corresponds to the target value of the vibration amplitude of the movable section 11 used when the performing the drive control of the mirror device 1 after terminating the start-up process.

Beat Detection

Then, a specific processing procedure of the beat detection in the step S4 shown in FIG. 5 will be explained with reference to FIG. 7.

The beat detection is performed immediately after increasing the frequency f of the drive signal of the mirror device 1 by a predetermined frequency Δf, and is composed of the following processing procedure.

In the step S21, based on the detection signal of the deflection angle detection section 4, acquisition of the data representing the vibration amplitude value corresponding to the deflection of the movable section 11 is started. In the step S22, the data thus acquired is stored (saved) in the memory. In the step S23, whether or not N data are acquired is determined.

According to a series of processes of the steps S21 through S23 described above, it is possible to acquire N data at predetermined time intervals based on the detection signal of the deflection angle detection section 4, and then store the N data thus acquired in the memory.

After acquiring the N data by the series of processes of the steps S21 through S23, the process proceeds to the subsequent step S24. In the step S24, a fast Fourier transform (FFT) process is performed based on the N data thus acquired and representing the vibration amplitude values corresponding to the deflection of the movable section 11.

In the step S25, the beat frequency fb described above is obtained based on the FFT process in the step S24. In the step S26, the frequency f1 is obtained from the formula 2 based on the frequency f of the drive signal when the beat frequency fb is obtained and the beat frequency fb (see FIG. 6). In the step S26, the frequency f1 thus obtained is stored (saved) in the memory as the frequency of the drive signal for driving the mirror device 1 again.

As described above, in the start-up process of the embodiment, it is arranged that processes of the steps S2 through S9 are performed in a range of the frequency of the drive signal of the mirror device 1 from fs to fp every time the frequency is increased by the predetermined frequency Δf as shown in FIG. 5.

In contrast, in the processes of the steps S11 through S14, it is arranged that the drive of the mirror device 1 is started with the frequency f1. Here, in the case in which the frequency f1 is not available, it is required that the starting frequency of the processes of the steps S11 through S14 are set to be a frequency (e.g., the frequency fs shown in FIG. 6, roughly 2 through 3% lower than the frequency f1) far lower than the frequency f1 due to the drive frequency hysteresis of the mirror device 1.

However, in the present embodiment, since the processes of the steps S11 through S14 can be started with the frequency f1, the process time of the steps S11 through S14 can significantly be reduced.

Other Embodiments

1. In the embodiment described above the beat frequency fb is obtained in the beat detection of the step S4 shown in FIG. 5, and an example of the method of obtaining the beat frequency fb is explained with reference to FIG. 7. However, the method of obtaining the beat frequency fb is not limited to what is shown in FIG. 7.

2. Although in the embodiment described above it is arranged that the processes of the steps S11 through S14 shown in FIG. 5 are started with the frequency f1, it is also possible to arrange that it is started with a frequency lower than the frequency f1 in order for reliably performing the process. In this case, it is preferable that the frequency with which the processes of the steps S11 through S14 are started is set to be a frequency roughly 0.01 through 0.1% lower than the frequency f1, for example.

3. Although in the embodiment described above the case in which the object of the drive control is a mirror device is explained, the invention can be applied to any device having a drive frequency hysteresis characteristic and requiring the start-up process described above.

Projector According to Embodiment

A projector according to an embodiment of the invention includes the mirror device drive control apparatus according to the embodiment described above and the mirror device, and the embodiment described later includes two pairs of mirror device drive control apparatus and mirror device. The mirror device drive control apparatus according to the embodiment described above is best suitable particularly for small-sized projectors, and exerts the advantages described above.

It should be noted that the mirror device drive control apparatus according to the embodiment described above can also be applied to scanners besides the projectors.

Hereinafter, the projector according to the embodiment of the invention will be explained with reference to the accompanying drawings.

Figure 8:
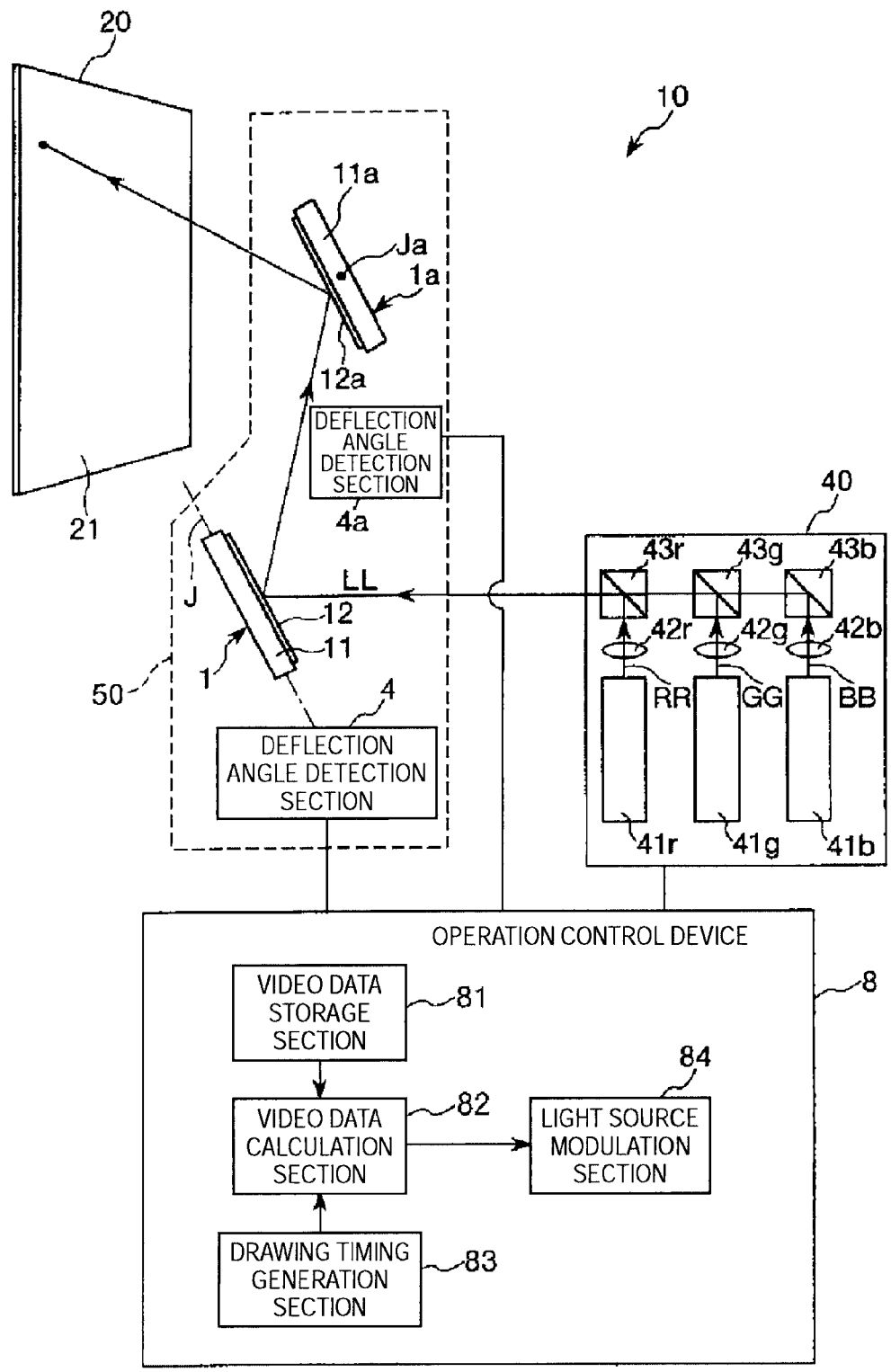
FIG. 8 is a diagram showing a configuration of a projector according to an embodiment of the invention.

FIG. 8 is a diagram showing a configuration of a projector according to the embodiment of the invention.

As shown in FIG. 8, the projector 10 is a projection image forming apparatus for scanning light on an object such as a screen 20 to thereby form (draw, project) images (videos).

A surface of the screen 20 on the projector 10 side constitutes a light scan surface on which the projector 10 scans the light, namely a projection surface 21. By the projector 10 scanning the light, predetermined images such as still images and moving images are drawn on the projection surface 21. By using such a screen 20, the visibility of the images can be enhanced.

A constituent material of the screen 20 is not particularly limited, and for example, polyethylene, polypropylene, polyvinyl chloride, polystyrene, polyamide, acrylic resin, ABS resin, fluorinated resin, epoxy resin, silicone resin, a copolymer, a polymer blend, a polymer alloy having any one of these compounds as a primary constituent, and so on can be cited, and one of these compounds can be used alone or two or more of these compounds can also be used in combination.

Then, the projector 10 will hereinafter be explained.

As shown in FIG. 8, the projector 10 has a light source unit (a light emitting section) 40 for emitting light, a light scanning section 50 for scanning the light emitted to the projection surface 21 from the light source unit 40, and an operation control device (a control section) 8 for controlling operations (drive) of the light source unit 40 and the light scanning section 50.

The light source unit 40 is provided with a red laser source 41r, a green laser source 41g, a blue laser source 41b, and collimator lenses 42r, 42g, 42b and dichroic mirrors 43r, 43g, 43b disposed correspondingly to the laser sources 41r, 41g, 41b of the respective colors.

The laser sources 41r, 41g, 41b of the respective colors have a red light source and a drive circuit for driving the light source, a green light source and a drive circuit for driving the light source, and a blue light source and a drive circuit for driving the light source, and emit red, green, blue laser beams RR, GG, BB, respectively. The laser beams RR, GG, BB are emitted in the condition of being modulated in accordance with a drive signal transmitted from a light source modulation section 84 of the operation control device 8 described later, and then respectively collimated by the collimator lenses 42r, 42g, 42b as collimating optical elements to be formed as fine beams.

The dichroic mirrors 43r, 43g, 43b have properties of reflecting the red laser beam RR, the green laser beam GG, and the blue laser beam BB, respectively, and combine the laser beams RR, GG, BB of the respective colors with each other to emit a single laser beam (light) LL.

It should be noted that a collimator mirror can be used instead of the collimator lenses 42r, 42g, 42b, and also in this case, fine collimated light beams can be formed. Further, in the case in which the collimated light beams are emitted from the laser sources 41r, 41g, 41b of the respective colors, the collimator lenses 42r, 42g, 42b can be eliminated. Further, the laser sources 41r, 41g, 41b can be replaced with light sources such as light emitting diodes for generating similar light beams. Further, the order of the laser sources 41r, 41g, 41b, the collimator lenses 42r, 42g, 42b, and the dichroic mirrors 43r, 43g, 43b of the respective colors shown in FIG. 8 is nothing more than an example, and the order can beset freely while keeping the combinations (the laser source 41r, the collimator lens 42r, and the dichroic mirror 43r are for red, the laser source 41g, the collimator lens 42g, and the dichroic mirror 43g are for green, and the laser source 41b, the collimator lens 42b, and the dichroic mirror 43b are for blue) of the respective colors.

Further, the light scanning section 50 is for scanning the laser beam LL emitted from the light source unit 40 on the projection surface 21 two-dimensionally by scanning (horizontal scan or primary scan) it in a horizontal direction (a first direction) while scanning (vertical scan or secondary scan) it in a vertical direction (a second direction perpendicular to a first direction) at a scan rate lower than that in the horizontal direction. The light scanning section 50 has the mirror device 1 (a first direction scanning section) 1 described above as a horizontal scanning mirror for scanning the laser beam LL emitted from the light source unit 40 on the projection surface 21 in the horizontal direction, and a mirror device (a second direction scanning section) 1a as a vertical scanning mirror for scanning the laser beam LL emitted from the light source unit 40 on the projection surface 21 in the vertical direction. It should be noted that since the mirror device 1a is substantially the same as the mirror device 1 described above, the explanation therefor will be omitted.

Further, the mirror device 1 and the mirror device 1a are disposed so that the rotational center axes J, Ja become perpendicular to each other. By disposing the mirror device 1 and the mirror device 1a in such a manner as described above, it is possible to scan the laser beam LL emitted from the light source unit 40 on the projection surface 21 two-dimensionally (in two directions perpendicular to each other). Thus, it becomes possible to draw a two-dimensional image on the projection surface 21 with a relatively simple configuration.

Further, the light scanning section 50 includes the drive section 2, the drive signal generation section 3, the deflection angle detection section 4 (4a) of each of the mirror device drive control apparatuses for performing drive control of the mirror device 1 and the mirror device 1a, respectively.

Further, the operation control device 8 has a video data storage section (a video data storing section) 81 for storing video data (image data) used when drawing the image, a video data calculation section 82, a drawing timing generation section 83, and a light source modulation section (a light modulation section) 84.

Further, the operation control device 8 includes a control section 5 of each of the mirror device drive control apparatuses for performing drive control of the mirror device 1 and the mirror device 1a, respectively.

When drawing an image on the projection surface 21 of the screen 20, video data is firstly input to the projector 10. The video data thus input is temporarily stored in the video data storage section 81 of the operation control device 8, then retrieved from the video data storage section 81, and the image is drawn using the video data.

Further, the drawing timing generation section 83 generates drawing timing information including information of timing at which the drawing is performed, and the drawing timing information is transmitted to the video data calculation section 82.

The video data calculation section 82 retrieves the video data corresponding to pixels to be drawn from the video data storage section 81 based on the drawing timing information input from the drawing timing generation section 83, then performs various correction calculation, and then transmits brightness data of the respective colors to the light source modulation section 84.

The light source modulation section 84 performs modulation of the laser sources 41r, 41g, 41b of the respective colors based on the brightness data of the respective colors input from the video data calculation section 82. Specifically, the light source modulation section 84 performs putting on/off, control (increase and decrease) the output, and so on of the laser sources 41r, 41g, 41b of the respective colors.

The laser beam LL thus emitted from the light source unit 40 is reflected by the mirror section 12 of the mirror device 1, subsequently reflected by the mirror section 12a of the mirror device 1a, and then projected (emitted) on the projection surface 21 of the screen 20. Further, by turning the movable section 11 at a first angular velocity and (at the same time) turning the movable section 11a at a second angular velocity lower than the first angular velocity under the control of the operation control section 8, the laser beam LL is scanned on the projection surface 21 in the horizontal direction and (at the same time) scanned in the vertical direction at a scanning rate lower than the scanning rate in the horizontal direction. Thus, the laser beam LL emitted from the light source unit 40 is two-dimensionally scanned on the projection surface 21, and the image is drawn on the projection surface 21.

It should be noted that it is also possible to arrange that the light emitted from the light source unit 40 is firstly reflected by the mirror section 12a of the mirror device 1a, and is then reflected by the mirror section 12 of the mirror device 1. In other words, it is also possible to have a configuration of performing the vertical scanning first, and then performing the horizontal scanning.

Although the mirror device drive control apparatus and the projector according to the embodiments of the invention are explained based on the embodiments shown in the accompanying drawings, the invention is not limited to these embodiments, but the configuration of each of the components can be replaced with any configuration having an identical function. Further, it is possible to add any other constituents to the invention.

Further, although in the embodiments described above two sets of mirror device drive control apparatus according to the embodiment of the invention and the mirror device (an actuator having a configuration on which resonant drive is performed) are used as the light scanning section of the projector, the invention is not limited thereto, and it is also possible to replace one of the two sets with a galvanometer mirror, for example.

Further, in the invention, it is also possible for the mirror device drive control apparatus to include the mirror device as a constituent thereof.]

The entire disclosure of Japanese Patent Application No: 2009-088719, filed Apr. 1, 2009 and 2010-033237, filed Feb. 18, 2010 are expressly incorporated by reference herein.

What is claimed is:

1. A mirror device drive control apparatus adapted to perform drive control of a mirror device having a hysteresis characteristic, comprising:
a drive section adapted to drive the mirror device with a drive signal;
a detection section adapted to detect a displacement of a movable section of the mirror device, and to generate and then output a detection signal corresponding to the detection; and
a start-up processing section adapted to perform a start-up process of the mirror device,
wherein the start-up processing section
detects a frequency of an envelope included in abnormal vibration of the movable section as a beat frequency fb based on the detection signal of the detection section,
obtains a predetermined frequency f1 based on a frequency f of the drive signal of the mirror device with which the beat frequency is detected and the beat frequency fb, and
drives the mirror device again with the drive signal having the frequency f1.

2. The mirror device drive control apparatus according to claim 1,
wherein the start-up processing section performs
a first process for sequentially increasing the frequency of the drive signal from a frequency for starting the drive to a frequency for ending the drive, and driving the mirror device with the drive section,
a second process for obtaining the frequency of the envelope included in the abnormal vibration of the movable section as the beat frequency fb based on the detection signal of the detection section when the frequency of the drive signal is increased in conjunction with the drive of the mirror device, and
a third process for obtaining the predetermined frequency f1 based on the frequency f of the drive signal with which the beat frequency fb is obtained and the beat frequency fb, and driving the mirror device again using the drive signal having the frequency f1.

3. The mirror device drive control apparatus according to claim 2, wherein
in the first process, the frequency of the drive signal is increased sequentially from the frequency for starting the drive to the frequency for ending the drive by a predetermined frequency Δf, and the drive section drives the mirror device, and
in the second process, in conjunction with the drive of the mirror device, the detection signal of the detection section is acquired a plurality of times at predetermined intervals immediately after the frequency of the drive signal is increased by the predetermined frequency Δf, the frequency of the envelope included in the abnormal vibration of the movable section is obtained as the beat frequency fb based on the detection signal acquired the plurality of times.

4. A projector comprising:
a mirror device having a hysteresis characteristic; and
the mirror device drive control apparatus according to claim 1 adapted to perform drive control of the mirror device.

* * * * *